Dec. 28, 1926.

A. BREGOZ

BRAKE

Filed Jan. 7, 1926  2 Sheets-Sheet 1

1,612,356

Inventor
Anthony Bregoz
By his Attorney

Dec. 28, 1926.

A. BREGOZ

BRAKE

Filed Jan. 7, 1926   2 Sheets-Sheet 2

1,612,356

Inventor
Anthony Bregoz
By his Attorney

Patented Dec. 28, 1926.

1,612,356

UNITED STATES PATENT OFFICE.

ANTHONY BREGOZ, OF NEW YORK, N. Y.

BRAKE.

Application filed January 7, 1926. Serial No. 79,703.

This invention relates to a brake adapted for use upon automobiles, motor busses or other vehicles and has for its object to produce a brake of this character which will be extremely efficient by reason of its large braking surface and which will be able to effectively check the speed of any heavy vehicle.

A further object of this invention is to provide a brake of the character mentioned, which will have but few parts subjected to wear and which will have its various moving parts enclosed and thus kept free from dirt and grit which causes wear and breakage.

With these objects and such other objects as may hereinafter appear, in view, I have devised the particular arrangement of parts hereinafter set forth and more particularly pointed out in the claims appended hereto.

Reference is to be had to the accompanying drawing, forming a part hereof, in which—

Throughout the various views of the drawings, similar reference characters designate similar parts.

Figure 1:
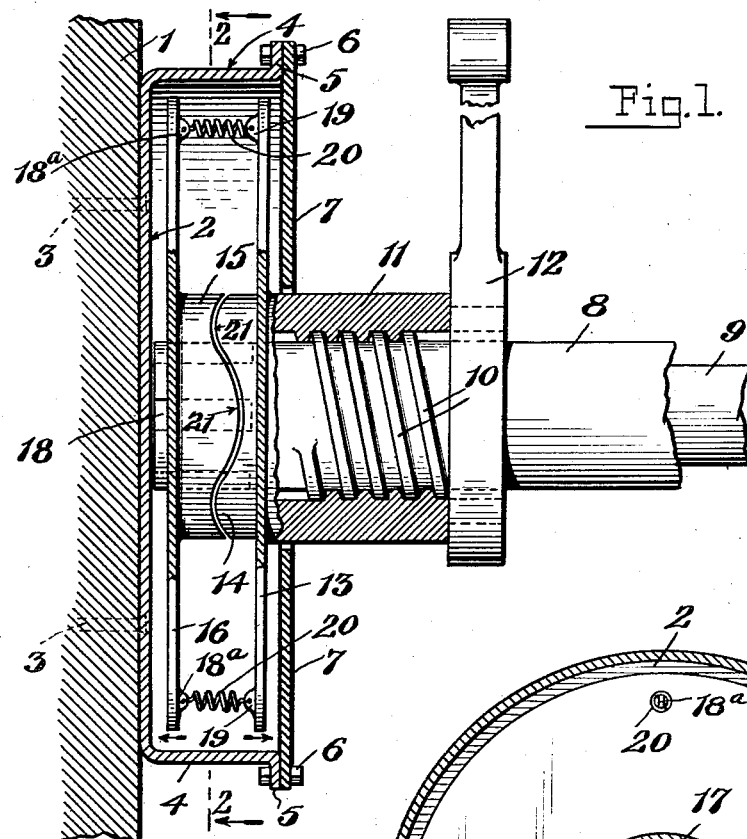
Figure 1 is a vertical sectional view of my improved brake.
Figure 2:
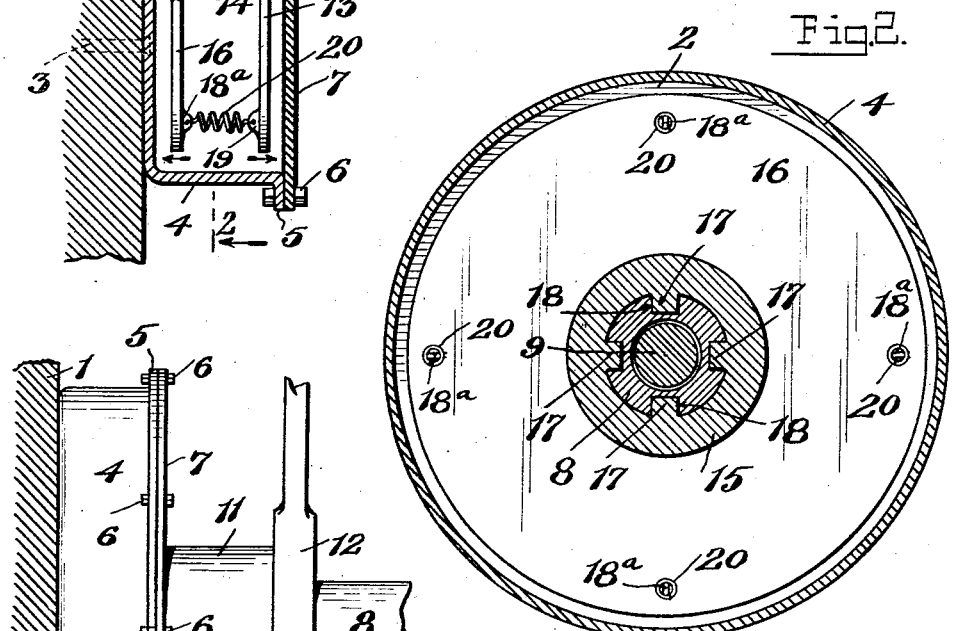
Figure 2 is a sectional view on the line 2—2 of Figure 1, looking in the direction of the arrows.
Figure 3:
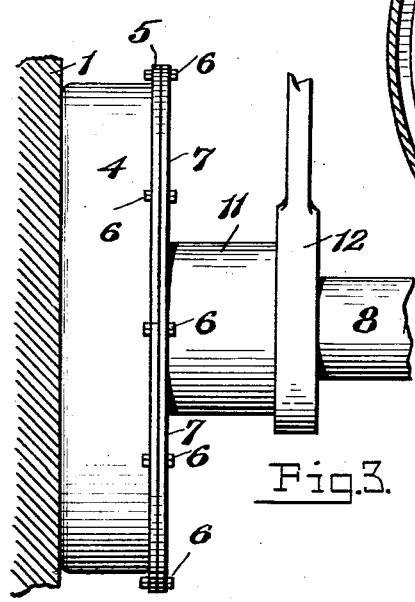
Figure 3 is a front elevation of the brake.

In the embodiment of my invention disclosed in the accompanying drawing, 1 indicates a part of one of the wheels of the vehicle, to which my improved brake is applied. Secured to the wheel by means of bolts or screws, a part of which is indicated at 3 is the brake drum, which is in the usual cylindrical form, having a base plate 2, and a circumferential outer wall 4. Said wall 4 is provided with a flanged edge 5 and the open face of the drum thus formed is closed by a disk-shaped plate 7 which is secured to the drum by a series of bolts 6 passing through the flange 5 on the drum.

At 8 is shown the axle housing, within which is the usual axle shaft 9. Adjacent to the brake drum, the axle housing 8 is provided with worm threads 10 on which a worm 11 is mounted. Secured on this worm 11 or forming a part of the same, is a lever 12 which is connected in the usual way to brake-actuating levers. Secured to or forming an integral part of the worm 11 is a brake disk 13 which is intended when the brake is applied to bear against the inner face of the plate 7 on the drum.

It will be seen that this application of the plate 13 against the inner face of the plate 7 is had by movement of the worm 11 on the threads 10. At 14 is shown a cam member which is integrally formed on or secured to that face of the plate 13 opposite to the worm and this cam has a series of higher points indicated at 21.

At 16 is another braking plate or disk and the same surrounds the axle housing 8 but is not capable of rotary movement thereon by reason of the fact that the same is provided with internal ribs 17 which lie in grooves 18 formed on the axle housing 8.

Through this construction, the plate 16 is enabled to slide longitudinally of the axle housing 8 so that it can, as will be hereinafter explained, be forced against the face 2 of the brake drum, simultaneously with the application of the plate 13 against the inner face of the plate member 7 on the drum.

At 15 is shown a cam member provided on one face of the plate 16 and said cam member has an edge corresponding to the edge of the cam 14 and having its high portions 21 lying within the low portions of the cam 14 when the brake is in its released position. (See Figure 1).

From the foregoing, the operation of my improved brake will be readily understood. In its normal position, the brake has its parts located as disclosed in Figure 1. When the lever 12 is drawn forward by the suitable brake-operating levers to which it may be connected, the worm 11 moves outward on the threads 10 so that the plate 13 is drawn over hard against the inner face of the brake drum plate 7. When this takes place, the cam 14 being rotated brings its higher points 21 against the similar higher points on the cam 15 so that said cam and its attached plate 16 is thrust in an opposite direction from that taken by the plate 13. This movement causes the plate 16 to be thrust over hard against the inner face of the surface 2. Thus, a simultaneous application of the plates or braking members 13 and 16 against their respective braking surfaces 7 and 2 takes place.

Figure 4:
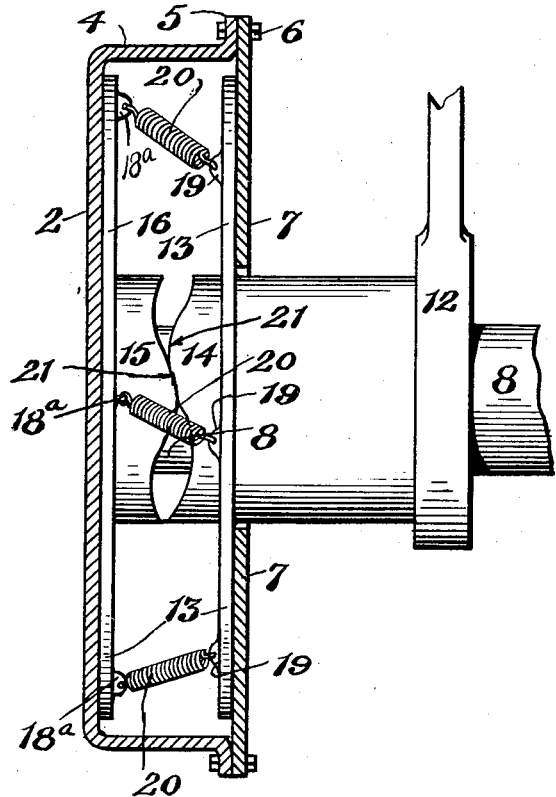
Figure 4 is a view of the brake, partly in section, showing the same as it appears while being applied.
Figure 5:
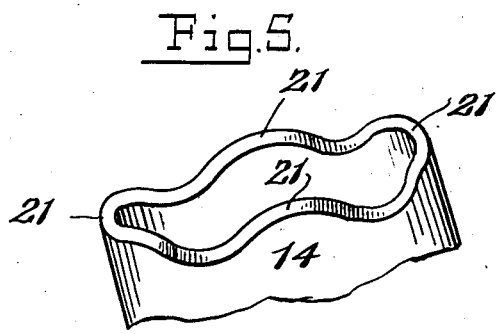
Figure 5 is a perspective view of a cam member located upon one of the brake disks.

In Figure 4, the parts are shown in their respective positions during the application of the brake. When pressure on the brake is released, the parts move back to their position shown in Figure 1, this releasing action being aided by springs 20 which are located between the two plates 13 and 16 and connected to ears 18ª and 19 on the faces of these plates.

While I have herein stated that my improved brake may be applied to the wheels of a vehicle, it is quite obvious that the same may be, without any or with little modification applied to a drive shaft or other part of a vehicle. It will also be clear that the faces of the plates 13 and 16 may be lined with any suitable brake lining and that these may be made in any desired area to secure an effective braking operation.

From the foregoing, it is obvious that my invention is not to be restricted to the exact embodiment shown but is broad enough to cover all structures coming within the scope of the annexed claims.

What I claim is:

1. A device of the class described comprising a drum, a pair of plates contained within the same and adapted to be brought to bear against the inner faces of said drum, means for moving the first one of said plates in one direction against one of the inner faces of the drum and co-operating means on both of the plates for causing the second plate to be moved in an opposite direction against another face of the drum by movement of the first-mentioned plate.

2. A device of the class described comprising an axle shaft, a wheel, a brake drum secured on the wheel, a pair of braking disks within the drum, means for moving one of the disks with a rotary movement to cause the same to be brought against a face of the drum and co-operating cam members on the disks for causing the other plate to be moved longitudinally of the axle shaft and against another face of the drum when the first mentioned disk is moved with a rotary motion.

3. A device of the class described comprising a rotated enclosing member having a pair of braking surfaces, a pair of plates within said member, means for moving one of said plates with a rotary movement to bring it into contact with one of the braking surfaces and means for causing the other plate to be moved away from the first plate and against the other braking surface by the rotary movement of said first plate.

4. A device of the class described comprising an enclosed brake drum provided with two braking surfaces, a pair of disk shaped plates within the drum for application to said braking surfaces, means for moving one of said plates with a rotary movement to cause the same to be brought against one of said braking surfaces and cam means on both of the plates for causing the other plate to be moved against the other braking surface.

5. A device of the class described comprising a fixed shaft, a driven wheel, a drum on said wheel, said drum having a pair of disk-shaped braking surfaces, a pair of plates within said drum, one of said plates being capable of rotary movement on said shaft, the other plate being only capable of sliding movement thereon, means for moving one of said plates with a rotary movement, means for causing the plate thus moved to be brought into contact with a braking surface on the drum and means on the plate thus moved for causing the other plate to be slid away from it and against the other braking surface.

6. A device of the class described comprising a shaft, a driven member, a drum on said driven member, a plate for closing said drum, brake plates movable on the shaft and contained within the drum, one of said plates being capable of rotary movement and the other plate being capable of sliding movement on the shaft, worm means for causing one of the plates to be applied to the plate on the drum and means on the plate thus applied for shifting the other plate away from it and applying it against a part of the drum.

7. A device of the class described comprising a shaft, a driven member, a drum on said member, a pair of plates within the drum, means located between the plates for spreading the same apart to cause them to be applied against opposite faces of the drum and means connected to one of said plates for manually moving said plate to cause said spreading movement and application of the plates to the drum.

8. A device of the class described comprising a shaft, a wheel, a drum secured thereto, a pair of brake plates contained within said drum, a cylindrical worm member on one of said plates, worm threads on the shaft, said worm being movable on said threads, a lever connected to said worm, ribs on the other plate, grooves in the shaft into which said ribs lie, and cam means on both of the plates adapted to co-operate to separate the plates and cause an application of the same to opposite faces of the drum when the worm member is moved on the shaft.

9. A device of the class described, comprising a brake drum, a pair of brake plates adapted to act against several faces on said drum, means for moving one of said plates with a rotary movement against one of the braking surfaces of the drum, and means for causing the other plate to be moved with a sliding movement against another braking surface of the drum when the first plate is rotated.

Signed at the city, county and State of New York, this 31st day of December, 1925.

ANTHONY BREGOZ.